Patented Dec. 1, 1942

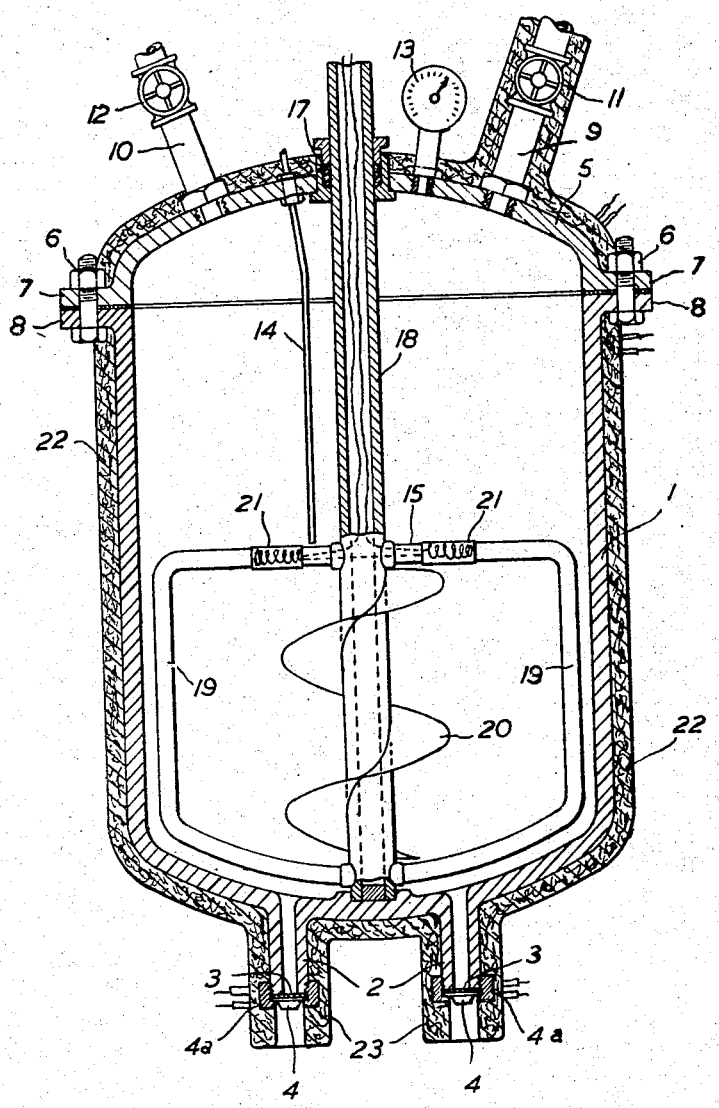

2,303,340

UNITED STATES PATENT OFFICE 2,303,340

PRODUCTION OF ARTIFICIAL MATERIALS

Henry Dreyfus, London, England, assignor to Celanese Corporation of America, a corporation of Delaware Application May 8, 1940, Serial No. 333,952
In Great Britain May 16, 1939

3 Claims. (Cl. 18—54)

This invention relates to the production of artificial filaments, threads, foils, films and similar shaped articles.

According to the invention, artificial filaments, threads, foils, films and similar shaped articles may be formed by extruding a fusible fibre- or film-forming substance or a composition containing the same, while in a fused or plastic condition, through orifices of appropriate shape under pressure applied directly to the materials by an inert liquid or vapour, and setting the extruded materials.

Pressure may be applied directly to the fused or plastic materials by means of water or a large number of other liquid agents, especially high-boiling liquids. Thus, alcohols and ethers, e. g. ethyl, n- and i-propyl, and i-amyl alcohols and the corresponding symmetrical ethers, the dimethyl ether of triethylene glycol, anisol, the dinaphthyl ethers and diphenyl ether, or hydrocarbons, e. g. petroleum ether, kerosene, benzene, toluene, acenaphthene, naphthalene and its alkyl and phenyl derivatives, phenanthrene, and partially or fully hydrogenated aromatic hydrocarbons, e. g. tetralin, may be employed. Halogen substitution derivatives may also serve as agents. While the agents employed are preferably such as are fluid at ordinary temperatures or at moderately elevated temperatures, e. g. temperatures of 50 or 70° C. up to 100-110° C., there may be employed other agents which become fluid at a temperature below the extrusion temperature of the materials, such as, for example, anthracene and its alkyl and aryl derivatives, and the dinaphthyls. The actual liquid employed will depend upon the temperature conditions and upon the characteristics of the substance or substances present in the materials. Alternatively, pressure may be applied directly to the fused or plastic materials by an inert vapour such as, for example, steam, or the vapour of a member of the groups of organic liquid agents specified above.

The present invention is particularly applicable to the production of filamentary articles, especially such as have a basis of a thermoplastic substance. Filamentary articles may be produced by extruding the fused or plastic materials through orifices and continuously collecting the extruded materials on rotating drums or the like, preferably at a rate in excess of that at which they emerge from the orifices so that draw-down is applied while they are still in a more or less fluid or plastic condition. Preferably the materials are extruded while at elevated temperature, whether or not the temperature employed is sufficient to effect fusion of the materials. Thus, for example, the materials may be heated electrically or by means of a steam coil. The inert liquid or vapour by means of which pressure is to be applied for extrusion is preferably maintained at a temperature at least as high as that of the materials, and the latter may themselves be heated by passing hot inert liquid or vapour through a powdered, granular or fused mass of the materials. When the fused or plastic materials are employed at elevated temperatures it is advantageous to make provision for heating the orifices so that the temperature of the materials is maintained up to the instant at which they leave the orifices.

An apparatus which can be employed for forming filaments from hot fused or plastic materials according to the invention is shown by way of example in the accompanying drawing.

A cast-iron or steel vessel 1, adapted to withstand high pressure, carries six narrow tubular elements 2 vertically projecting from its base, each carrying fine metal gauze 3 and dished plates 4 suitably drilled to serve as spinnerets, retained by nuts 4a. The head 5 of the vessel is removable for cleaning purposes, being clamped to the body of the vessel by bolts 6 operating in opposing flanges 7 and 8. The head carries two tubes 9 and 10, the former being lagged, equipped with stop valves 11 and 12 to allow for introducing and withdrawing liquids and/or vapours, a pressure gauge 13, and a device 14 for controlling the internal temperature of the vessel as indicated below. A stirrer 15 mounted in the vessel to rotate in the bearings 16 and 17, the latter provided with a stuffing box, comprises a hollow shaft 18 carrying stirrer arms 19 and a conveyor screw 20, and is driven by gears not shown, so that on rotation the conveyor screw tends to cause liquid in which it is immersed to rise. Although not so illustrated, the stirrer arms are preferably not disposed in a vertical plane but are sloped so that on rotation they tend to cause liquid to fall. The stirrer arms are wound with coils 21 supplied with alternating current by leads through the hollow shaft 18 and adapted to generate heat by power losses in the stirrer arms and the lower portion of the shaft. The current flowing in the coils is controlled thermostatically by the device 14.

Lagging 22 is provided over the whole surface of the vessel, including the head, to reduce heat losses from the vessel, and electrical heating wires are provided in the lagging on the body of the vessel to allow for heating the contents.

Further separately controlled electrical heating coils are provided in lagging 23 which surrounds the projecting tubular elements 2 and extends below the level of the plates 4 by an amount approximately equal to the diameter of the coils, so that the face of the plates may be heated.

In operation, according to a preferred method, the vessel is filled with a high boiling petroleum hydrocarbon, which is brought by the passage of current through the electrical heating wires in the lagging 22 to the temperature at which it is desired to extrude the fused or plastic materials. The current is then switched off from this circuit and that to the coils 21 and those in the lagging 23 switched on, and power is applied to the stirrer so as to rotate it at a slow rate, e. g., 1 to 2 rotations per minute. The current necessary to maintain the face of the plates 4 at the desired temperature can be determined by simple experiment, being adjusted to give satisfactory spinning. From another vessel, not shown, pre-fused materials are fed through the pipe 9 into the vessel, hydrocarbon being simultaneously forced out through the pipe 10 until the materials, which sink to the bottom of the vessel, fill it to about ⅔ of its volume. The valve 12 is then closed and a suitable pressure developed through a reservoir of hydrocarbon communicating with the vessel through the pipe 9 so that the fused materials are extruded through the spinning orifices. As required, further fused materials may be introduced into the vessel through the pipe 9, hydrocarbon being allowed to flow off through the pipe 10, if necessary. It is desirable to ensure that the level of fused materials in the vessel does not vary to any great extent during spinning, so that uniform results may be obtained.

If desired, electrical heating elements may be placed inside the vessel and the stirrer dispensed with, or alternatively, reliance may be placed on external wiring for all heat generation.

Instead of providing externally projecting tubular elements to carry the spinnerets, similar elements projecting inwards from the base of the vessel may be provided, and the plates carrying the spinning orifices mounted at the upper ends of these. This construction avoids the need for wiring the tubular elements. The tubular elements, whether projecting outwards or inwards, may have a diameter of 1 inch or less, e. g., ⅛ or ¼ of an inch up to 2 or 3 inches.

While in the above description, reference has been made to heating the contents of the vessel by electrical heating coils, it is to be understood that other heating means may be employed. For example, the vessel may be surrounded by a jacket through which hot oil or other heating fluid may be circulated so as to provide the necessary heat.

If extrusion is to be effected under the pressure of an inert liquid and the materials are to be heated to a temperature above the normal boiling point of that liquid, this temperature will determine the minimum pressure within the vessel and this pressure may be sufficient to effect extrusion. However, additional pressure may be applied through the liquid to assist in extruding the composition. Total pressures may range from 5 atmospheres or less up to 40 or 50 atmospheres or even more. For example, pressures of 12 to 15 or 20 atmospheres may be employed. Suitable temperatures, particularly for use with cellulose acetate or compositions having a basis thereof, are, for example, from 150° or 180° to 220° or 230° C., especially from 185° to 195° C. However, higher temperatures, e. g., up to 250° or 300° C. or more, may be employed, depending inter alia upon the nature of the materials and the size of the orifices.

The extruded materials are preferably received, directly after leaving the extrusion orifices, in a gaseous or vaporous medium having such a composition, and maintained at such a temperature and pressure that any tendency to rapid change in the composition or physical state of the materials is reduced. For example, fused cellulose acetate extruded under pressure may be received in an atmosphere of wet steam maintained at a temperature of the order of 120–130° C. or more. Setting of the materials may be effected or, if already commenced in the said gaseous or vaporous medium, may be completed by introducing them into a cool liquid non-solvent medium. Advantageously, this medium brings about a rapid and, preferably, considerable temperature drop, e. g., of the order of 100–200° C., or more, in the extruded materials shortly after they emerge from the orifices. Thus the fused or plastic materials may be extruded into a gaseous or vaporous medium as described above, and the extruded materials be led after a short travel in that medium, e. g., a travel corresponding to a time of 0.05–0.1 or 0.25 second, into a relatively cold liquid medium which acts as a setting medium. Such a liquid medium may consist wholly of non-solvent for the fibre- or film-forming substance or it may contain a proportion of a solvent or softening agent therefor. For example, when an acetic acid ester of cellulose or a composition having a basis of such an ester is extruded, it may be set by introduction into a relatively cool aqueous solution of diacetone alcohol, diethyl tartrate or ethyl lactate, preferably in a concentration of 25–65%. It may be desirable, according to the tenacity, extension and pliability desired in the products, to employ a medium which will withdraw part or all of any plasticiser which may be present in the materials. Thus, an extruded composition comprising cellulose acetate and a high proportion of dimethyl phthalate may be passed into aqueous alcohol. Compositions containing phenols or other acidic softening agents may be set in a dilute aqueous solution of caustic soda, provided that the solution does not have an undesired effect upon other components of the composition. Salts, e. g. sodium chloride and calcium chloride, may be dissolved in the setting medium.

Alternatively, a gaseous or vaporous medium, e. g., air or steam, which is preferably circulated under conditions which permit strict control of its temperature, may be employed for setting purposes in place of the above-mentioned liquid non-solvent medium. Such a medium may be maintained at super-normal, normal, or sub-normal pressure.

The fused or plastic materials may consist wholly of one or more fusible fibre- or film-forming substances. In general, however, it is preferable to employ compositions which contain plasticisers for the fibre- or film-forming substance. Suitable plasticisers for cellulose acetate and like compositions are, for example, di- and tri-acetin, tri-phenyl-acetin, phenols, tri-cresyl phosphate, dialkyl phthalates, dibutyl tartrate and the sulphonamides, e. g., p-toluene sulphonamide. Phenols, especially high boiling phenols, e. g., resorcinol and diphenylol propane, acetamide, methyl formamide, adipamide, benzamide, sulphonamides, e. g., p-toluene sulphonamide, lactic acid, glycollic acid, formic acid and acetic acid are examples of substances which may be employed to increase the plasticity of compositions having a basis of fibre- and film-forming polyamides, and such substances are to be regarded as covered by the term "plasticiser" in connection with such compositions.

Plasticisers may be employed in proportions of 5 or 10 up to 35 or 40% or even more based on the weight of the fibre- or film-forming substance. A particularly suitable composition having a basis of an acetic acid ester of cellulose is one containing about 15-20% of dimethyl phthalate or other plasticiser. The compositions may also contain other agents in order to modify their properties or to give various effects in the product. They may contain, for example, high boiling solvents, pigments, dyes and/or fire-retardants.

Distribution of plasticisers and other agents throughout the compositions should be as uniform as possible. This may be effected for example by treating the fibre- or film-forming substance with a solution or dispersion of a plasticiser in a non-solvent for the substance, e. g., water, benzene or an ether, and allowing the substance to absorb the plasticiser from the solution or dispersion, the non-solvent being removed by evaporation as described in my U. S. Patent No. 1,999,405. Alternatively, a plasticiser may be distributed over the surface of particles of the substance which are moistened with a non-solvent, e. g. water, benzene or an ether, and the non-solvent removed by evaporation as described in U. S. application Serial No. 143,940, filed May 21, 1937, while the acetic acid ester of cellulose is dry. Another method by which the agents may be uniformly distributed comprises treating the fibre- or film-forming substance with a solution or dispersion of the agents in a volatile solvent for the substance or by adding the agents to a solution of the substance in a volatile solvent. In the former case the materials are worked, e. g., by malaxation, until the substance is dissolved. When a uniform solution and/or dispersion of the components has been obtained, the volatile solvent may be evaporated, either wholly or in part, so as to leave the required composition. The plasticisers and other agents may also be dispersed throughout the fibre- or film-forming substance by heating the latter under an inert liquid which is to be used to apply pressure to the fused or plastic composition and which is preferably without substantial solvent action on the plasticisers or other agents, and then introducing the agents in finely divided form and dispersing them with the substance in the body of inert liquid, preferably with vigorous stirring. The dispersion, which should be sufficiently coarse to ensure rapid settling, is then allowed to settle, preferably in a separate heated closed vessel, and the intimate mixture of substance and agents is then in condition for extrusion under pressure transmitted through the inert liquid.

Particular reference has been made above to acetic acid esters of cellulose as the fibre- or film-forming substance suitable for the production of shaped articles according to the invention. Among such esters may be mentioned cellulose acetate, aceto-propionate, aceto-butyrate, and aceto-stearate. However, the process of the invention is applicable to a large range of other fusible fibre- or film-forming substances, such as, for example, other cellulose derivatives, e. g., cellulose propionate, butyrate, stearate and propio-stearate, cellulose ethers such as ethyl cellulose and benzyl cellulose, and ether-esters of cellulose such as ethyl cellulose acetate and oxy-ethyl cellulose acetate, polyvinyl esters and ethers, e. g., polyvinyl acetate, polyvinyl chloride, polyvinyl-chlor-acetate and copolymers of vinyl acetate and vinyl chloride, polymerised esters of unsaturated acids, e. g., those of the acrylic and methacrylic acid series, fibre- or film-forming polyamides, e. g., the products obtained by condensation of diamines with dicarboxylic or disulphonic acids or by self-condensation of amino-carboxylic or amino-sulphonic acids, and other fibre- or film-forming polymers obtainable by condensation of bi-functional reagents.

The shaped articles may be subjected to various treatments after they have been set, with a view to modifying their characteristics. For example, they may be subjected to a stretching operation, whether or not they have been stretched before setting. Before such a stretching operation applied after setting, the materials may be treated with a softening agent, e. g., a solution of a solvent or plasticiser or a solvent vapour, and/or they may be softened by heat. Advantageously, the materials, especially those having a basis of an organic derivative of cellulose or of a fibre- or film-forming polymer obtainable by condensation of bi-functional reagents, particularly fibre- or film-forming polyamides, are stretched while immersed in or wetted with water or other non-solvent containing hydroxyl radicles, whether in liquid or vapour form. Thus they may with advantage be stretched while immersed in hot water or while in a steam chamber. In this way, the tenacity of the products may be still further increased.

Alternatively or in addition, the articles may be subjected to the action of a shrinking agent, e. g. a solution of a solvent for the fibre- or film-forming substance, in the absence of stretching tension so as further to modify their properties.

Again, shaped articles having a basis of fibre- or film-forming substances containing free hydroxyl groups, particularly such as have a basis of cellulose derivatives containing free hydroxyl groups, may be esterified. For example, shaped cellulose derivative articles may have their ironing point substantially raised by esterifying them with halides of polycarboxylic acids, e. g., adipyl, phthalyl, oxalyl, succinyl or thionyl chloride, and/or with the corresponding anhydrides, for example as described in U. S. application S. No. 306,704, filed November 29, 1939, U. S. application S. No. 344,460, filed July 8, 1940. Further modification and improvement of the products may be secured by treatment according to the process described in U. S. application S. No. 355,376, filed September 4, 1940, corresponding to British application No. 26,057/39. The combination of forming shaped articles according to the process of the invention and subsequently esterifying them to increase their ironing point renders it possible to spin products from substances having melting points which are undesirably low for textile purposes but which are advantageous in that the spinning temperature, which is determined by the melting point, may be lower.

Filamentary products produced according to the invention may be associated together, e. g., by twisting, to form yarns and they may then be employed in the manufacture of woven, knitted or other fabrics. Filaments of relatively high denier may be employed directly as artificial horse-hair or bristles. The filamentary products may also be coalesced under the influence of solvents, plasticisers, and/or heat, to form unitary products suitable for use as bristles or the like.

For the production of fibres according to the invention, filamentary products produced as described above may be cut after winding or while travelling, e. g., by the methods described in U. S. application S. No. 155,949, filed July 27, 1937; U. S. Patents Nos. 2,079,094 and 2,010,078; and British Patents Nos. 357,565 and 317,025.

Such fibres are preferably products from filamentary materials which have been crimped, e. g., by twisting as yarns, setting the twist by steaming or similar treatment, and untwisting. Alternatively or in addition the cut fibres may be crinkled by treatment with a solution of a solvent or swelling agent as described, for example, in U. S. applications S. Nos. 306,904, filed November 30, 1939; 319,076, filed February 15, 1490; and 318,709, filed February 13, 1940. The fibres so produced may be spun into yarn.

Films, foils and the like produced according to the invention may be employed for many of the purposes to which cellulose acetate or similar artificial films, foils and the like have previously been applied. For example, they may be employed for wrapping purposes, as bases for carrying photographic emulsions, as glass substitutes, and for the manufacture of splinterless glass.

Example

A composition comprising 85% of cellulose aceto-butyrate (acetyl value 12.9%, calculated as acetic acid; butyryl value 54.4%, calculated as butyric acid) and 15% of dimethyl phthalate is fused under kerosene by heating to 185° C. and fed into a vessel as shown in the accompanying drawing, the vessel being previously filled with kerosene and brought to 185° C. A pressure of 200 lbs./sq. in. is applied through a reservoir of hot kerosene and the fused cellulose acetate composition is extruded through the spinning orifices into a chamber containing wet steam at 125° C. through which the extruded materials pass in a time of 0.1 second, and thence into a bath of water maintained at 25° C. The extruded materials are continuously withdrawn from the bath and wound up so as to draw them down during travel from the orifices.

Having described my invention, what I desire to secure by Letters Patent is:

1. Process for the production of artificial filaments, threads, foils, films and similar shaped articles, which comprises extruding a fusible fiber-forming substance, while in a fused or plastic condition, through orifices of appropriate shape under pressure applied directly to the material by an inert liquid and setting the extruded materials.

2. Process for the production of artificial filaments, threads, foils, films and similar shaped articles, which comprises extruding a fusible organic derivative of celulose, while in a fused or plastic condition, through orifices of appropriate shape under pressure applied directly to the material by an inert liquid and setting the extruded materials.

3. Process for the production of artificial filaments, threads, foils, films and similar shaped articles, which comprises extruding a fusible acetic acid ester of cellulose, while in a fused or plastic condition, through orifices of appropriate shape under pressure applied directly to the material by an inert liquid and setting the extruded materials.

HENRY DREYFUS.